United States Patent [19]
Klein

[11] 3,879,333
[45] Apr. 22, 1975

[54] VINYL POLYMER COMPOSITIONS

[75] Inventor: Dieter H. Klein, Midland, Mich.

[73] Assignee: The Dow Chemical Company, Midland, Mich.

[22] Filed: Apr. 4, 1973

[21] Appl. No.: 347,826

[52] U.S. Cl..... 260/33.4 R; 260/29.6 T; 260/29.6 TA; 260/849; 260/882; 260/884; 260/885; 260/886
[51] Int. Cl. ............................................. C08f 19/00
[58] Field of Search ..... 260/884, 885, 2 EN, 486 B, 260/486 R, 89.5 R, 33.4

[56] References Cited
UNITED STATES PATENTS

| | | | |
|---|---|---|---|
| 3,017,396 | 1/1962 | Arond | 260/86.3 |
| 3,511,897 | 5/1970 | Endsley | 260/885 |
| 3,651,005 | 3/1972 | Walus | 260/31.4 R |
| 3,716,506 | 2/1973 | Simms | 260/882 |
| 3,746,673 | 7/1973 | Simms | 260/882 |

*Primary Examiner*—Joseph L. Schofer
*Assistant Examiner*—Paul R. Michl
*Attorney, Agent, or Firm*—Ronald G. Brookens

[57] ABSTRACT

Improved vinyl polymer compositions and nonaqueous dispersions thereof prepared by forming, in a strongly hydrogen bonded dispersing media, a polymeric composition comprising (I) a side chain insoluble in said dispersing media which side chain comprises a polymer of a vinyl monomer which contains a proton donor or proton acceptor group and (II) a backbone soluble in said dispersing media comprising the product of reaction of (IIA) tripropylene glycol methylether acrylate and a compound (IIB) selected from the group consisting of compounds of the formula

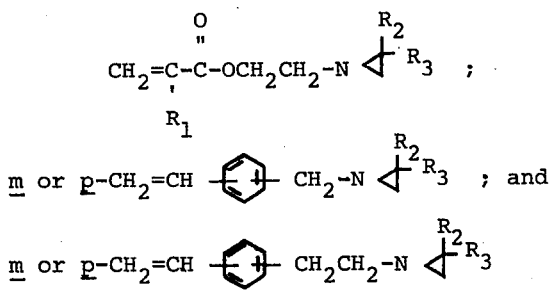

where
$R_1$ is hydrogen or $CH_3$,
$R_2$ is hydrogen or lower alkyl, and
$R_3$ is hydrogen or lower alkyl;

wherein the mass ratio of (IIA) to (IIB) is about from 99:1 to 80:20 and wherein the mass ratio of (I) to (II) is from about 95:5 to 80:20.

9 Claims, No Drawings

VINYL POLYMER COMPOSITIONS

BACKGROUND OF THE INVENTION

British Pat. No. 1,052,241 discloses the preparation of nonaqueous dispersions of synthetic polymers by incorporating in the disperse polymer particles a graft copolymer in which one polymeric chain is solvated by the dispersing media and another polymeric chain is nonsolvated by the dispersing media and is associated with the insoluble disperse polymer. More particularly, this patent discloses the nonaqueous dispersion polymerization of nonpolar monomers such as styrene, vinyl toluene, divinylbenzene, isoprene, butadiene, isobutylene and ethylene as well as the higher fatty esters of unsaturated acids such as acrylic, methacrylic and ethacrylic acids; in a polar, strongly hydrogen bonded diluent.

It is an object of the present invention to provide improved polymer compositions and nonaqueous dispersions thereof in strongly hydrogen bonded diluents. More particularly, it is among the objects of this invention to provide nonaqueous dispersions in strongly hydrogen bonded diluents wherein such dispersions are characterized by improved shelf stability, i.e., reduced tendency for the dispersed polymer particles to settle; improved product viscosity, i.e., the ability to form high molecular weight polymers while maintaining relatively low viscosities; and improved clarity in films prepared from such nonaqueous dispersions. It is a further object to prepare an improved dispersion stabilizer wherein the backbone component thereof, i.e., that component which is solvated by the dispersing media used, more readily reacts with a monomer which contains a proton donor or acceptor group.

SUMMARY OF THE INVENTION

The above and related objects are attained by the preparation, as nonaqueous polymeric dispersions, solutions, hydrosols and colloidal suspensions in a strongly hydrogen bonded dispersing media, of polymeric compositions comprising (I) a side chain insoluble in said dispersion media which chain is formed by reaction of an ethylenically unsaturated first monomer containing a proton donor or proton acceptor group adapted to react in a ring opening addition reaction with an aziridinyl ring and one or more second monomers copolymerizable with said first monomer, and (II) a backbone which is soluble in said dispersing media and which comprises the product of reaction if (IIA) tripropylene glycol methylether acrylate and a compound (IIB) selected from the group consisting of compounds of the formula

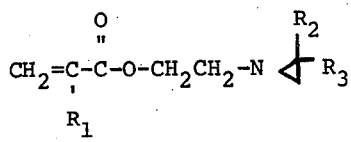

(such compounds are prepared by reaction of aziridinyl alcohols and methyl esters of acrylic or methacrylic acid); or a compound corresponding to the formula

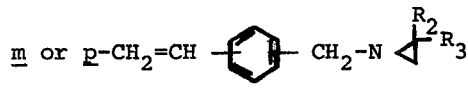

(such compounds are prepared by reaction of ar-vinylbenzyl chloride or bromide and an aziridine in the presence of excess aziridine and a base such as KOH); or a compound corresponding to the formula

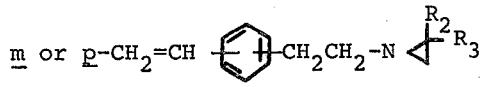

(such compounds are prepared by reaction of an aziridine and divinyl benzene). In the above formulas, $R_1$ is hydrogen or $CH_3$, $R_2$ is hydrogen or lower alkyl, e.g., 1 to 4 carbon atoms, and $R_3$ is hydrogen or lower alkyl, e.g., 1 to 4 carbon atoms. The mass ratio of (IIA) to (IIB) is from about 99 to 1 to about 80 to 20. Preferred compounds for (IIB) are those wherein $R_2$ is hydrogen and $R_3$ is methyl or ethyl. Especially preferred compounds are those wherein $R_2$ and $R_3$ are both hydrogen. The mass ratio of (I) to (II) is about 95:5 to 80:20.

DESCRIPTION OF THE PREFERRED EMBODIMENTS

The term "vinyl" monomer as herein used and as used in the art, includes ethylenically unsaturated monomers which, though not of vinyl structure in the strict sense, polymerize according to the vinyl polymerization mechanism, for example, monomers which are vinylidene or ethylenic monomers but which are polymerized in the vinyl manner, as well as doubly unsaturated monomers such as butadiene, are within the term. Particularly preferred vinyl monomers are acrylic acid, acrylates and methacrylates of alkanols or glycols, preferably with 1–22 carbon atoms, e.g., methyl acrylate, ethyl acrylate, butyl acrylate, methyl methacrylate, butyl methacrylate; hydroxy acrylates and methacrylates of alkanes or alkanols with 1–22 carbon atoms, e.g., hydroxyethyl or propyl methacrylate or hydroxybutyl acrylate. Other monomers include lower alkyl acetates, styrene, tertiary butyl styrene, chloro styrene, vinyl chloride, acrylonitrile, vinyl acetate, vinyl proprionate, acrylamides, vinylidene chloride; and optionally the compounds (IIB) above can be used as well as methylol acrylamide and tri-lower-alkyl amine methacrylamides, e.g., trimethylamine, 1,1-dimethyl 1-(2-hydroxypropyl)amine, and 1,1-dimethyl 1-(2,3-dihydroxypropyl)amine methacrylamides. Mixtures of these are preferred and in such mixtures the proportions will vary considerably with the intended use.

The component (II) is formed from (IIA) and (IIB) and is a macromonomer solvatable in a strongly hydrogen bonded organic dispersant, as hereinafter described, wherein the mass ratio of (IIA) to (IIB) is from 99:1 to 80:20, and preferably from about 99:1 to 97:3.

The compound, herein referred to as (IIA) is essential for achieving solubility in the strongly hydrogen bonded dispersing media. It is to be understood that such compound may contain small amounts of homologous materials having somewhat higher molecular weight.

The compounds (IIB) of this invention are considerably more reactive than previously used monomers and can be ionically polymerized by addition of small amounts of acid or other proton donor. Thus, the polymers formed by use of this reactive monomer are of higher molecular weight than prior polymers. By reason of the increased number of reactive sites, it is available for cross-linking and thus assists in avoiding the necessity of adding an external cross-linking agent to the total composition.

An important advantage of this invention is the ability to form higher molecular weight, more stable, and higher solids content dispersions by use of the dispersion polymerization technique. This is achieved by balancing the charges in the system. By use of the compounds designated IIB, the polymer backbone is basically charged. But by controlling the subsequently grafting composition, it is possible to produce a net charge that is either basic or acidic. This charge is determined by the type of vinyl polymer desired as the coating composition per se. Thus, if a precursor (backbone only containing the basic charge) is graft copolymerized with a mixture of vinyl monomers including a small amount of a monomer whose functional group is either proton donating; especially a copolymerizable carboxylic or hydroxylic monomer (acrylic acid, methacrylic acid, maleic anhydride, itaconic acid, crotonic acid, fumaric acid), or proton accepting; especially a copolymerizable primary, secondary, or tertiary amine (2-dimethylaminoethyl methacrylamide, t-butylaminoethyl methacrylate, dimethylaminoethyl methacrylate, N-vinyl-2-pyrrolidone); a stable nonaqueous copolymer dispersion can be made. The critical proton donating or accepting monomer quarantees an amphiphatic balance and the functional group serves as an absorbent, reactant, or promotes association of the stabilizer onto the polymer particles. Alternatively, if a preformed stabilizer is used, then the backbone has already been reacted during the opening of the aziridinyl ring with either the proton donating or accepting monomer and the remaining vinyl monomers may be as noted above with an additional basic or acidic monomer added to neutralize the stabilizer charge and promote dispersibility. From the previous art, it is clear that the charge concept has not been taught to prepare stabilized nonaqueous dispersions using strongly hydrogen bonded dispersants.

The preferred method of preparation of the improved nonaqueous dispersions is to use the macromonomer (II) with side chains already grafted thereon (this is what is termed a preformed graft stabilizer).

It is also possible to add the macromonomer (II) to the dispersing media which is used for the dispersion polymerization so that (II) is present in the seed stage and in this stage graft copolymer is formed in situ between II and polymerizing monomer. Either way the coating composition is formed by dispersion polymerization in the presence of said stabilizer and by balancing the charges on the stabilizer and vinyl polymer, a stable improved coating composition results.

The polymer ultimately formed in the non-aqueous dispersions of this invention may be present, for use as coating compositions, in amounts up to about 70 percent solids.

Generally, further increased solids make the composition too highly viscous, but stability will improve at high solids. This polymer is preferably a random copolymer. One preferred polymer comprises 10 percent hydroxy ethyl acrylate, 10 percent acrylonitrile, 80 percent vinylidene chloride and 0–5 percent proton donor or acceptor. Another preferred composition contains 30 percent methyl acrylate and 70 percent acrylonitrile. The hydroxy substituted and other optional monomers can be eliminated but in this invention an advantage is that the hydroxy substituted monomer can be used without undesirably modifying the stability of the polymer because of the basic charges achieved in (II) via use of (IIB). In prior art compositions, it was necessary to exclude carboxyl monomers in order to get workable nonaqueous compositions. Furthermore, carboxy containing monomers are often preferred in this invention. By inclusion of such monomers, it is now possible to cross-link, via the carboxy group, both the backbone (II) and at the side chains of the soluble graft copolymer described herein. The N-H in the ring-opened aziridinyl group serves as a cross-linking site and some cross-linkage is thus achieved with the carboxy group. However, if hydroxy groups are present, it may be necessary to add cross-linking agents. Satisfactory agents include resins which are soluble in the nonaqueous dispersion such as melamine-formaldehyde, urea-formaldehyde resins, or polymers containing isocyanate or blocked isocyanate groups. This gives internal strength, toughness, and flexibility to the coating. As noted above in the choice of monomers for use in dispersion systems, it is possible to pick monomers to give the vinyl polymer particles an acidic or basic charge and achieve the right balance of charges.

In choosing the amount of proton donor the ratio of soluble to insoluble monomers in the side chain composition is determinative; thus, a proton donor is used at about 5–30 percent by weight of the side chain composition and when little or no insoluble monomer (e.g., acrylonitrile) is used a maximum (20–30 percent) proton donor is used. However, if a proton acceptor is used, there is no limit on the proportion and the side chain can be 100 percent of such monomer.

In the dispersion polymerization, nontoxic organic hydrophilic solvents can be used which is an added advantage in view of anti-pollution laws.

This invention is adapted to produce colloids (organic systems), solution, lacquers and dispersions via the nonaqueous dispersion route. The nonaqueous dispersion (NAD) resulting can be used, per se, or added improvements can be achieved by using colloidal systems. To form such systems, the technique involves removing the solvent used in the dispersion polymerization to form about 70 percent solids. After stripping solvent, a coupling solvent is added; this is defined as a solvent or mixture thereof which is compatible with both the dispersed polymer and the solvent to be added to make a colloid. Examples are given hereinafter. This addition is made to form about 25–60 percent polymer solids in the system.

In all such uses the stabilizer is inherently associated with polymer but is present at low weight percents and serves in ultimate use as a stabilizer for the coating composition only when the dispersion is used, per se. In the colloidal systems, its function is reduced by the coupling solvent. However, in all appropriate systems, it serves as a self-cross-linking agent and internal plasticizer.

As noted above, the nonaqueous dispersion technique (NAD) is also used to make solution polymers and colloids. The NAD technique uses nontoxic diluents in which the monomers are polymerized, forming large polymer particles of high molecular weight.

The conversion from monomer to polymer in nonaqueous dispersion polymerization takes place more rapidly than in solution polymerization; namely, 5 hours versus 10 hours.

The total diluent composition should contain at least 65 percent by weight of a strongly hydrogen bonded material. Any remainder may be a poorly bonded and/or moderately hydrogen bonded solvent or mixture thereof. Some of the solvents which may be used in this invention are summarized on the following table:

| Solvent | Solubility Parameter $\gamma$ | Hydrogen Bonding Index | Classification |
|---|---|---|---|
| Hexane | 7.3 | 2.1 | |
| Isopar E (Isooctane) | 7.1 | 2.5 | |
| VM&P Naphtha | 7.6 | 2.5 | Poorly Hydrogen Bonded |
| High boiling aromatics | 8.5 | 2.5 | |
| Toluene | 8.9 | 3.3 | |
| Xylene | 8.8 | 3.5 | |
| Ethyl | 9.1 | 5.2 | |
| Methyl Ethyl Ketone | 9.3 | 5.4 | |
| Acetone | 10.0 | 5.9 | |
| Isopropyl acetate | 8.4 | 6.0 | |
| Ethylene glycol ether acetate | 8.7 | 6.5 | Moderately Hydrogen Bonded |
| Diacetone alcohol | 9.2 | 6.8 | |
| Ethylene glycol butyl ether | 8.9 | 7.0 | |
| Ethanol | 12.7 | 8.5 | |
| Butanol (iso) | 10.5 | 8.5 | Strongly Hydrogen Bonded |
| Butanol (n) | 11.4 | 8.5 | |
| Isopropanol | 11.5 | 8.7 | |
| $H_2O$ | None | >9.0 | |

Hydrogen bonding indexes are assigned arbitrarily and as can be seen on the preceding table may be used to classify solvents into three groups; poorly, moderately and strongly hydrogen bonded.

However, the diluent composition for colloids should be chosen so as to meet air pollution law legislations, e.g., not more than 20 percent toluene or 8 percent xylene or 20 percent diisobutyl ketone, etc.

To increase the plasticization (e.g., where large amounts of nonfatty acrylates are used) external compatible plasticizers conventional in such systems can be added. Preferred plasticizers are esters of phthalic acid, e.g., cyclohexyl butyl ester, dicyclohexyl ester, or benzylhexyl ester.

Other cross-link agents may be methylol acrylamide, methylol methacrylamide, and amine imide monomers as already mentioned above.

Furthermore, it is recommended that IIB can be used as self-cross-linking agents. Other monomers to be used are already described above which can avoid addition of external cross-linkers.

The invention is best understood by reference to the following illustrative examples:

EXAMPLE 1

A. Preparation of dispersion stabilizer precursor 1200 parts isooctane were heated to 115°C. in a vessel fitted with stirrer and reflux condenser. During 5 hours a mixture of 697 parts of tripropylene glycol methylether acrylate and 7 parts of 2-(1-aziridinyl ethyl)methacrylate and 1.4 parts of α(t-butylazo)isobutyronitrile was added at a constant rate. The mixture was heated for an additional hour to ensure complete reaction. 4.1 parts acrylic acid were mixed with 0.5 part hydroquinone and added immediately afterwards with vigorous stirring. The liquid was heated to reflux for another 3 hours and then cooled. The suspension was then allowed to stand for 5 hours to allow the liquids to separate. The lower layer was decanted and vacuum stripped until solids content reached 90 percent.

B. Preparation of polymer dispersion

A 400 cc citrate bottle was loaded as follows:

80 parts vinylidene chloride, 5 parts acrylonitrile, 5 parts ethyl acrylate, 10 parts acrylic acid, 35 parts methanol, 5.5 parts of the precursor solution of "A" above and 0.5 part azobisisobutyronitrile. The bottle was capped and put in a rotating tumbler containing water having a temperature of 65°C. After 12 hours the bottle was removed and cooled. A fine particle size latex of 70 percent solids was obtained.

EXAMPLE 2

A. Preparation of dispersion stabilizer precursor 930 parts isooctane, 468.8 parts tripropylene glycol methylether acrylate, 31.2 parts 3-mercaptopropionic acid, 5 parts of α(t-butylazo)isobutyronitrile were heated to reflux in a vessel described in Example 1 for 6 hours. 46 parts of 2-(1-aziridinyl ethyl)methacrylate were mixed with 0.5 part hydroquinone and added immediately afterwards with vigorous stirring. The liquid was contained at reflux for another 3 hours and cooled. The polymer was isolated as described in Example 1.

B. Preparation of polymer dispersion

A 400 cc citrate bottle was loaded as follows:

80 parts vinylidene chloride, 5 parts acrylonitrile, 5 parts methyl acrylate, 10 parts acrylic acid, 35 parts methanol, 5.5 parts of the precursor solution of A above and 0.5 part azobisisobutyronitrile. The bottle was capped and put in a rotating tumbler containing water having a temperature of 65°C. After 10 hours the bottle was removed and cooled. A fine particle size latex of 70 percent solids was obtained. The molecular weight of the nonsolvated polymer was about 65,000.

EXAMPLE 3

A. Preparation of dispersion stabilizer precursor 900 parts isooctane were heated to 98°C. in a vessel described in Example 1. During 2½ hours a mixture of 663 parts tripropylene glycol methylether acrylate, 11.5 parts acrylic acid, 300 parts hexane and 3.5 parts α(t-butylazo)isobutyronitrile was added at a constant rate and the liquid heated for a further hour to ensure conversion. 16.5 parts 2-(1-aziridinyl ethyl)methacrylate were mixed with 0.3 part hydroquinone and added immediately afterwards with vigorous stirring. The liquid was continued to reflux for another 3 hours and then cooled. The polymer mixture was again treated as described under Example 1.

B. Preparation of polymer dispersion

A 400 cc citrate bottle was loaded as follows:

80 parts vinylidene chloride, 10 parts acrylonitrile, 10 parts hydroxy ethyl acrylate, 35 parts ethanol, 5.5 parts of the precursor solution of A above and 0.5 part of diisopropyl peroxy dicarbonate. The bottle was capped and put in a rotating tumbler containing water having a temperature of 50°C. After 6 hours the bottle was removed and cooled. The contents were stirred vigorously into the equal part of water. The precipitated product was filtered and dried at room temperature on an open tray for three days. The fine powder dissolved easily in methyl ethyl ketone, tetrahydrofuran, toluene or mixtures of mentioned solvents. The solution polymer could be formulated to a pigmented coating containing iron oxide. When cross-linked the coating exhibited excellent abrasion resistance, toughness, elongation and adhesion on mylar, glass, metal, etc. This polymer was found to be especially suitable as a magnetic tape coating.

EXAMPLE 4

A 400 cc citrate bottle was loaded as follows:

90 parts vinylidene chloride, 10 parts methyl acrylate, 5.5 parts precursor solution of Example 3, 0.5 part diisopropyl peroxy dicarbonate, and 100 parts methanol. The bottle was capped and put in a rotating tumbler containing water having a temperature of 50°C. After 6 hours the bottle was removed and cooled. The contents were filtered through a Buchner funnel and the polymer dried in air for several days. The dried polymer dissolved in a mixture of 65 percent tetrahydrofuran and 35 percent toluene to a crystal clear solution.

EXAMPLE 5

A. Preparation of preferred graft copolymer 70 parts of the precursor of Example 3 were mixed with 227 parts butanol, 60 parts methyl methacrylate, 1.2 parts 2-(1-aziridinyl ethyl)methacrylate and 3 parts azodiisobutyronitrile. The mixture was heated under inert gas for 2 hours at 90°C.

B. Preparation of polymer dispersion

A mixture of 1,000 parts n-butanol, 42 parts acrylonitrile, 18 parts methyl acrylate, 200 parts preformed graft stabilizer solution and 3 parts azobisisobutyronitrile was heated to 90°C. and after 20 minutes a fine bluish latex had been formed. A mixture of 560 parts acrylonitrile, 240 parts methyl acrylate, 70 parts of preformed graft stabilizer solution and 5 parts of azobisisobutyronitrile, was fed into the batch over a period of 3 hours to yield a fairly viscous latex of about 40 percent solids.

EXAMPLE 6

A. Preparation of preformed graft copolymer 70 parts of the product of Example 3 were mixed with 227 parts methanol, 60 parts lauryl methacrylate, 1.2 parts 2-(1-aziridinyl ethyl)methacrylate and 3 parts azodiisobutyronitrile. The mixture was heated under inert gas at reflux for 2 hours.

B. Preparation of polymer dispersion

A mixture of 1,000 parts methyl alcohol, 200 parts preformed graft stabilizer dispersion of A above and 2 parts azobisisobutyronitrile was heated to reflux. A mixture of 744 parts styrene (and/or tertiary butyl styrene), 56 parts divinyl benzene, 70 parts of preformed graft stabilizer dispersion and 5 parts of azobisisobutyronitrile, was fed into the batch over a period of 3 hours to yield a viscous latex of about 40 percent solids. The 2-(1-aziridinyl ethyl)methacrylate in the preformed graft stabilizer dispersion may be substituted with vinyl benzyl aziridine to obtain similar results.

EXAMPLE 7

A. Preparation of dispersion stabilizer precursor 1,200 parts isooctane were heated to reflux in a vessel described earlier under Example 1. During 5 hours a mixture of 679.0 parts tripropylene glycol methylether acrylate, 21 parts glycidyl methacrylate and 3.5 parts azobisisobutyronitrile was added at a constant rate and the liquid heated for a further hour to ensure complete conversion from monomer to polymer. The reflux condenser was replaced by a take-off condenser and the mixture distilled until the temperature of the mixture reached 130°C.

17.6 parts methacrylic acid, 0.4 part dimethylcocoamine and 0.6 part hydroquinone were added. The liquid was heated to reflux at 130°C. for 6 hours and then cooled. The suspension was then allowed to stand for 5 hours to allow the liquids to separate. The lower layer was decanted and vacuum stripped until the polymer was crystal clear. The solids content of the viscous solution at this point was 90 percent.

B. Preparation of polymer dispersion

Example 6B was repeated using the precursor solution A above. The resulting dispersion was much higher in viscosity and the stability was inferior. This example shall demonstrate that more basic materials such as aziridine compounds furnish more stable dispersions than compounds which contain oxirane rings such as, e.g., glycidyl methacrylate. These findings comply with previously taught charge concepts.

EXAMPLE 8

A. Preparation of dispersion stabilizer precursor 900 parts isooctane were heated to 98°C. in a vessel as described earlier in Example 1. During 2 hours a mixture of 715 parts tripropyl glycol methylether acrylate, 11.5 parts acrylic acid, 300 parts isooctane and 3.5 parts 2(t-butylazo)isobutyronitrile was added at a constant rate and the liquid heated for a further 3 hours. The reflux condenser was replaced by a take-off condenser and 910 parts of isooctane was distilled off. Then 120 parts of a paraffinic solvent having a distillation range of 384° to 430°F. were added to ensure that the reflux temperature was 140°C.

12 parts allyl glycidyl ether, 0.22 part dimethylcocoamine and 100 parts of a normal paraffinic solvent having a distillation range of 384°–430°F. were added. The liquid was refluxed until at least 30 percent of the allyl glycidyl ether was reacted and then cooled. The suspension was treated in the same way as described in Example 7A.

B. Preparation of polymer dispersion

A 400 cc citrate bottle was loaded as follows:

70 parts vinylchloride, 30 parts methyl acrylate, 100 parts n-butanol, 3.5 parts of the precursor solution of A above and 0.6 part diisopropyl peroxy dicarbonate. The bottle was capped and put in a rotating tumbler containing water having a temperature of 50°C. After 6 hours the bottle was removed and cooled. A latex of a mixture of fine (0.3–0.6µ) and coarse (5–10µ) particle size was obtained.

EXAMPLE 9

A. Preparation of dispersion stabilizer precursor

A self polyester of 12-hydroxy stearic acid of molecular weight 1,500–1,700 condensed with 2-(1-aziridinyl ethyl)methacrylate to introduce a polymerizable double bond was copolymerized with tripropylene glycol methylether acrylate and acrylic acid in the ratio of 74:24:2 in the presence of isooctane at 100°C. in the same fashion as described under Example 3A. After the conversion was complete the copolymerized acrylic acid was reacted with 2-(1-aziridinyl ethyl)methacrylate. A 35 percent solution of a polymeric stabilizer containing grafting sites of molecular weight above 25,000 was formed.

70 parts of the product of A above were mixed with 220 parts n-butanol, 60 parts methyl methacrylate, 1.2 parts 2-(1-aziridinyl ethyl)methacrylate and 3 parts azodiisobutyronitrile was heated to 90°C. for 3 hours. The low viscosity solution was used to prepare a polymer dispersion as follows:

B. Preparation of polymer dispersion

A mixture of 800 parts isooctane, 200 parts n-butanol, 200 parts preformed graft stabilizer solution, 4.5 parts hydroxyethyl acrylate, 25.50 parts styrene, 6 parts acrylonitrile, 24 parts tripropylene glycol methylether acrylate and 3 parts azobisisobutyronitrile was heated to 90°C. for 45 minutes. After 20 minutes a fine dispersion had been formed. A mixture of 60 parts hydroxyethyl acrylate, 340 parts styrene, 80 parts acrylonitrile, 320 parts tripropylene glycol methylether acrylate, 10 parts of the product of A above, and 8 parts azobisisobutyronitrile, was fed into the batch over a period of 3 hours to yield a fairly stable dispersion of about 40 percent solids. This is an example of a stabilizer which may be employed to prepare a dispersion in a mixture of a hydrophobic-hydrophilic diluent.

EXAMPLE 10

A. Preparation of dispersion stabilizer precursor

A 35 percent solids solution in isooctane of a polymeric stabilizer with a molecular weight of approximately 40,000 was prepared by the addition polymerization in the solvent mixture of lauryl methacrylate, tripropylene glycol methylether acrylate and acrylic acid in the proportion of 64:33.7:2.3. After the conversion was complete, the copolymerized acrylic acid was reacted with 2-(1-aziridinyl ethyl)methacrylate.

70 parts of the above product were mixed with 176 parts isooctane, 44 parts n-butanol, 60 parts methyl methacrylate, 1.2 parts 2-(1-aziridinyl ethyl)methacrylate and 3 parts azobisisobutyronitrile and heated to 90°C. for 3 hours. The low viscosity solution was used to prepare a polymer dispersion as follows:

B. Preparation of polymer dispersion

A mixture of 800 parts isooctane, 200 parts n-butanol, 200 preformed graft stabilizer solution above, 4.5 parts hydroxypropyl acrylate, 25.5 parts methyl methacrylate, 6 parts acrylonitrile, 24 parts ethyl acrylate and 3 parts azobisisobutyronitrile was heated to 90°C. for 45 minutes. After 20 minutes a fine dispersion had been formed. A mixture of 60 parts hydroxypropyl acrylate, 340 parts methyl methacrylate, 320 parts ethyl acrylate, 80 parts acrylonitrile, 10 parts of the precursor product of A above and 8 parts of azobisisobutyronitrile, was fed into the batch over a period of about 3 hours to yield a dispersion of about 40 percent solids.

EXAMPLE 11

Preparation of polymer dispersion

A 400 cc citrate bottle was loaded as follows:

90 parts vinylidene chloride, 10 parts methyl acrylate, 5.5 parts precursor solution of Example 3A, 0.5 part diisopropyl peroxy dicarbonate, and 100 parts methanol. The bottle was capped and put in a rotating tumbler containing water having a temperature of 50°C. After 6 hours the bottle was removed and cooled. The contents were filtered through a Buchner funnel and the polymer dried in air for several days. The dried polymer dissolved in a mixture of 65 percent tetrahydrofuran and 35 percent toluene to a crystal clear solution.

What is claimed is:

1. A polymeric composition comprising (I) a side chain insoluble in a strongly hydrogen bonded organic media which chain is formed by reaction of an ethylenically unsaturated first monomer containing a proton donor or proton acceptor group adapted to react in a ring opening addition reaction with an aziridinyl ring and one or more second monomers copolymerizable with said first monomer said side chain being grafted to (II) a backbone soluble in said organic media said backbone consisting essentially of the product of the reaction of (IIA) tripropylene glycol methylether acrylate and (IIB) a compound selected from the group consisting of compounds of the formula

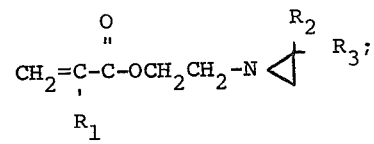

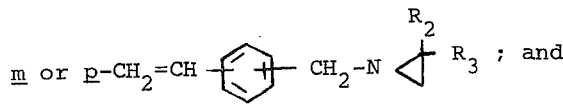

where
$R_1$ is hydrogen or $CH_3$,
$R_2$ is hydrogen or lower alkyl, and
$R_3$ is hydrogen or lower alkyl; and wherein the mass ratio of (IIA) to (IIB) is from about 99:1 to about 80:20 and wherein the mass ratio of (I) to (II) is from about 95:5 to 80:20.

2. The composition of claim 1 wherein (I) comprises 5–30 percent by weight of a polymerizable monomer containing a proton donor group or 5–100 percent by weight of a polymerizable monomer containing a proton acceptor group, with the balance, if any, of said (I) comprising at least one member selected from the group consisting of a copolymerizable carboxylic acid, acrylates and methacrylates of alkanols or glycols with 1–22 carbon atoms, hydroxy acrylates and methacrylates of alkanes or alkanols with 1–22 carbon atoms, a lower alkyl acetate, styrene, tertiary butyl styrene, chlorostyrene, vinyl chloride, acrylonitrile, vinyl acetate, vinyl proprionate, acrylamide, and vinylidene chloride and optionally one or more members selected from the group consisting of 2-(1-aziridinyl) ethyl methacrylate, N-(p-vinylbenzyl)aziridine, methylol acrylamide and tri-lower-alkyl amine methacrylamide.

3. The composition of claim 2 in the form of a dispersion in a strongly hydrogen bonded organic dispersing media.

4. The composition of claim 3 wherein said dispersing media contains at least about 65 percent by weight of an aliphatic alcohol containing from about 1 to 4 carbon atoms.

5. The composition of claim 4 containing in combination therewith a cross-linking agent dispersed in said dispersing media.

6. The composition of claim 5 wherein said cross-linking agent is selected from the group consisting of an organic isocyanate; a methylated, propylated or butylated melamine formaldehyde resin; and a urea-formaldehyde resin.

7. The method of making a coating composition comprising a stabilized vinyl polymer in dispersion form comprising the steps of
A. Forming a graft copolymer stabilizer by
A1. polymerization in a strongly hydrogen bonded organic media of (I) tripropylene glycol methylether acrylate and (IIB) a compound of the formula

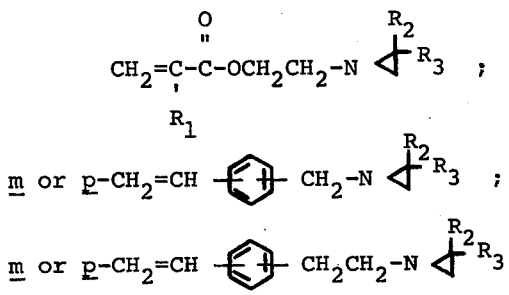

where
R₁ is hydrogen or CH₃,
R₂ is hydrogen or lower alkyl, and
R₃ is hydrogen or lower alkyl; and wherein the mass ratio of (IIA) to (IIB) is from about 99:1 to about 80:20 to form a backbone which is soluble in said organic media; then
A2. opening the aziridinyl ring of the compound of (IIB) by addition of a proton donating or proton accepting polymerizable monomer; and
A3. grafting a side chain onto said backbone which side chain is insoluble in said organic media, and
B. Copolymerizing vinyl monomers containing at least one of the monomers used in A3 in the presence of said stabilizer.

8. The method of claim 7 wherein said side chain comprises 5–30 percent by weight of a polymerizable monomer containing a proton donor group or 5–100 percent by weight of a polymerizable monomer containing a proton acceptor group, with the balance, if any, comprising at least one member selected from the group consisting of a copolymerizable carboxylic acid, acrylates and methacrylates of alkanols or glycols with 1–22 carbon atoms, hydroxy acrylates and methacrylates of alkanes or alkanols with 1–22 carbon atoms, a lower alkyl acetate, styrene, tertiary butyl styrene, chloro-styrene, vinyl chloride, acrylonitrile, vinyl acetate, vinyl proprionate, acrylamide, and vinylidene chloride and optionally one or more members selected from the group consisting of 2-(1-aziridinyl)ethyl methacrylate, N-(p-vinylbenzyl)aziridine, methylol acrylamide and tri-lower-alkyl amine methacrylamide.

9. The method of claim 8 wherein said dispersing media contains at least about 65 percent by weight of an aliphatic alcohol containing from about 1 to 4 carbon atoms.

* * * * *